United States Patent [19]

Ichikawa

[11] Patent Number: 5,050,554

[45] Date of Patent: Sep. 24, 1991

[54] IGNITION TIMING CONTROL APPARATUS FOR ENGINES

[75] Inventor: Akira Ichikawa, Obu, Japan

[73] Assignee: Nippondenso Co., Ltd., Kariya, Japan

[21] Appl. No.: 512,455

[22] Filed: Apr. 23, 1990

[30] Foreign Application Priority Data

Apr. 26, 1989 [JP] Japan .................... 1-106802
Aug. 5, 1989 [JP] Japan .................... 1-203643

[51] Int. Cl.$^5$ ............................ F02P 5/06; F02P 5/00; F02P 5/14
[52] U.S. Cl. ................................ 123/419; 123/417; 123/422
[58] Field of Search ............... 123/419, 417, 422, 442, 123/443

[56] References Cited

U.S. PATENT DOCUMENTS

| 4,919,098 | 4/1990 | Shimada et al. | 123/422 |
| 4,928,652 | 5/1990 | Shinya et al. | 123/417 |
| 4,953,532 | 9/1990 | Nagano et al. | 123/419 |

FOREIGN PATENT DOCUMENTS

| 51-45002 | 12/1976 | Japan | 123/419 |
| 56-162264 | 12/1981 | Japan | 123/419 |
| 61-37457 | 8/1986 | Japan | 123/419 |
| 0244869 | 10/1986 | Japan | 123/419 |
| 61-258955 | 11/1986 | Japan | 123/419 |
| 0208672 | 8/1988 | Japan | 123/419 |
| 2075590 | 11/1981 | United Kingdom | 123/419 |

Primary Examiner—Raymond A. Nelli
Attorney, Agent, or Firm—Cushman, Darby & Cushman

[57] ABSTRACT

An ignition timing control apparatus for an engine which is capable of accurately estimating an engine speed immediately following the engine coming into an acceleration condition thereby enhancing the accuracy of ignition timing control, and a faulty cylinder detecting apparatus for a multi-cylinder engine using a crank angle sensor which generates a limited number of pulses. The apparatus generates a signal which divides each ignition cycle into a first rotation angular interval where an engine speed variation is large and a second rotation angular interval where an engine speed variation is small. Corresponding first and second rotation time intervals are detected in response to the signal. In accordance with these angular intervals and time intervals, an acceleration correction is effected to estimate a second rotation angular interval in a next ignition cycle. In accordance with the estimated second rotation angular interval in the next ignition cycle, a timing for ignition signal generation is set thereby generating an ignition signal at the timing. A faulty cylinder is detected in accordance with the estimated first rotation time interval and the detected first rotation time interval. A faulty cylinder may be detected in accordance with computed first and second unit rotation time intervals.

20 Claims, 7 Drawing Sheets

IGNITION TIMING CONTROL APPARATUS FOR ENGINES

BACKGROUND OF THE INVENTION

The present invention relates to an ignition timing control apparatus for controlling the ignition timing of an engine by an electronic control.

It is well known in the art that during the acceleration condition of an engine the engine speed varies considerably and therefore in order that the ignition timing may be controlled optimally it is necessary to provide an acceleration correction when estimating an engine speed. Apparatus have been proposed in the past in which such acceleration correction is provided by using two ignition cycle times (e.g., Japanese Patent Publications No. 51-45002 and No. 61-37457).

However, this type of known ignition timing control apparatus requires at least two ignition cycle times to provide the necessary acceleration correction during the acceleration operation of an engine.

Therefore, a time is required until the acceleration correction is provided. This gives rise to a problem that when the engine comes into an acceleration condition, the accuracy of the engine speed estimation is lowered due to the delayed acceleration correction and hence the accuracy of the ignition timing control is deteriorated.

Also, apparatuses have been developed in the past in which the detection of any faulty cylinder in a multi-cylinder engine is effected in accordance with the maximum and minimum values of the engine speed during every ignition cycle so as to effect the detection with respect for example to faults in the secondary side of the ignition coil, the fuel system, etc., (e.g., JP-A-61-258955).

This type of apparatus is disadvantageous in that since the maximum and minimum values of the engine speed during every ignition cycle must be detected, a signal must be generated for every small degrees of crankshaft rotation and therefore the apparatus cannot be applied to engines of the type employing a crank angle sensor which generates a limited number of pulses.

SUMMARY OF THE INVENTION

It is therefore an object of the present invention to provide an ignition timing control apparatus for an engine which is so designed that immediately after the engine has come into an acceleration condition the provision of an acceleration correction is made and hence the accurate estimation of an engine speed is made possible immediately following the acceleration condition of the engine thereby enhancing the accuracy of the ignition timing control.

It is another object of the present invention to provide a fault detecting apparatus for engines which is capable of detecting any faulty cylinder even in the case of a multi-cylinder engine of the type employing a crank angle sensor which generates a limited number of pulses.

Figure 1:
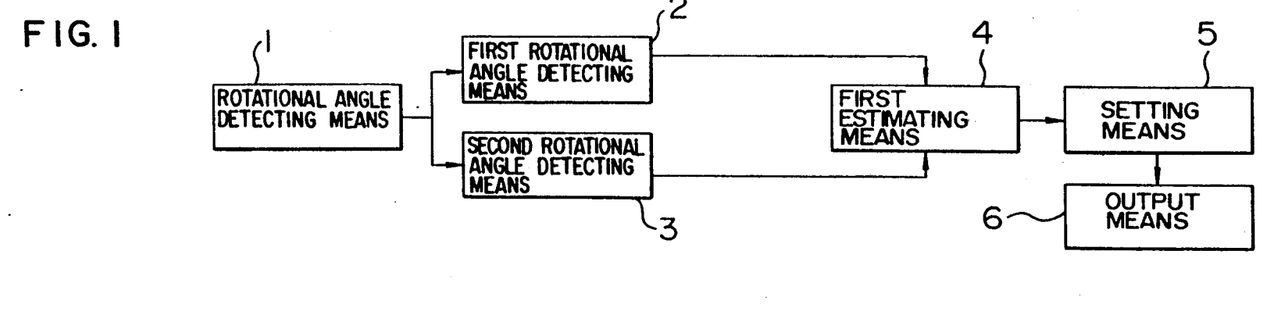
FIG. 1 is a block diagram illustrating the basic construction of the present invention.

In accordance with one aspect of the present invention, there is provided an ignition timing control apparatus for an engine including, as shown in FIG. 1, detecting means 1 for detecting rotational angle whereby during an acceleration condition of an engine each ignition cycle is detected by dividing it into a first rotational angle where the engine speed varies greatly and a second rotational angle where the engine speed varies not greatly, first rotational angle time detecting means 2 for detecting a time corresponding to the first rotational angle, second rotational angle time detecting means 3 for detecting a time corresponding to the second rotational angle, first estimating means 4 whereby the engine is approximately considered to make an uniform acceleration motion during the first rotational angle to provide an acceleration correction in accordance with the detected first and second rotational angle times and the detected first and second rotational angles thereby estimating a second rotational angle time in the next ignition cycle, setting means 5 responsive to the next-cycle second rotational angle time estimated by the first estimating means 4 to set a timing for generating an ignition signal, and output means 6 responsive to the timing set by the setting means 5 to output an ignition signal.

Thus, during the acceleration condition of the engine the rotational angle detecting means 1 generates a signal which divides each ignition cycle into a first rotational angle where the engine speed varies greatly and a second rotational angle where the engine speed varies not greatly. The corresponding first and second rotational angle times to the signal are detected. Then, the first estimating means 4 provides an acceleration correction to estimate a second rotational angle time in the next ignition cycle. In response to the next-cycle second rotational angle time, the setting means 5 sets a timing for generating an ignition signal and the output means 6 generates an ignition signal at the timing set by the setting means 5.

In accordance with another aspect of the present invention, there is provided a fault detecting apparatus for an engine which includes rotational angle detecting means for detecting each ignition cycle of the engine by dividing it into a first rotational angle where the engine speed varies greatly and a second rotational angle where the engine speed varies not greatly, rotational angle time detecting means for detecting a time corresponding to the first rotational angle and a time corresponding to the second rotational angle, acceleration condition detecting means for detecting an acceleration condition of the engine, and faulty cylinder detecting means for detecting a faulty cylinder of the engine in accordance with the first rotational angle time and the second rotational angle time when the acceleration condition of the engine is detected by the acceleration condition detecting means.

Thus, firstly the rotational angle time detecting means detects the first rotational angle time and the second rotational angle time in response to the signal from the rotational angle detecting means.

Then, when the acceleration condition of the engine is detected by the acceleration condition detecting means, the fault cylinder detecting means detects a faulty cylinder in accordance with the first and second rotational angle times.

Further, in the faulty cylinder detecting means, first fault detecting means detects a faulty cylinder in accordance with the first rotational angle time estimated by rotational angle time estimating means and the first rotational angle time detected by the rotational angle time detecting means.

Still further, in the faulty cylinder detecting means, second fault detecting means detects a faulty cylinder in accordance with the first and second unit rotational angle times computed by unit rotational angle time computing means.

As described in detail hereinabove, in accordance with the ignition timing control apparatus of the present invention, the provision of a correction for the estimation of a engine speed during the acceleration condition is effected in accordance with first and second rotational angle times which are measurable during the ignition cycle of the preceding cylinder so that the necessary correction for the estimation of an engine speed can be provided immediately after the engine has come into the acceleration condition and thus the accuracy of the ignition timing control during the acceleration condition can be enhanced.

Also, as described in detail hereinabove, in accordance with the present invention, during the acceleration period each ignition cycle is divided into a first rotational angle where the engine speed variation is great and a second rotational angle where the engine speed variation is not great and the detection of a faulty cylinder is detected in accordance with the first and second rotational angle times respectively corresponding to the first and second rotational angles. Thus, there is a great effect that the detection of a faulty cylinder as well as faults in the secondary side of the ignition coil, the fuel system, etc., can also be effected in the case of a multi-cylinder engine using a crank angle sensor which generates a limited number of pulses.

BRIEF DESCRIPTION OF THE DRAWINGS

FIG. 3, a-e is a timing chart showing the operation of the embodiment during the acceleration condition of the engine.

FIG. 4, a & b is a timing chart showing the operation of the embodiment during a steady-state condition of the engine.

FIG. 7, a, b & c is a timing chart showing the operation of still another embodiment during the acceleration condition of the engine.

DESCRIPTION OF THE PREFERRED EMBODIMENTS

The present invention will now be described in greater detail with reference to an embodiment applied to a four-cylinder four-cycle engine.

Figure 2:
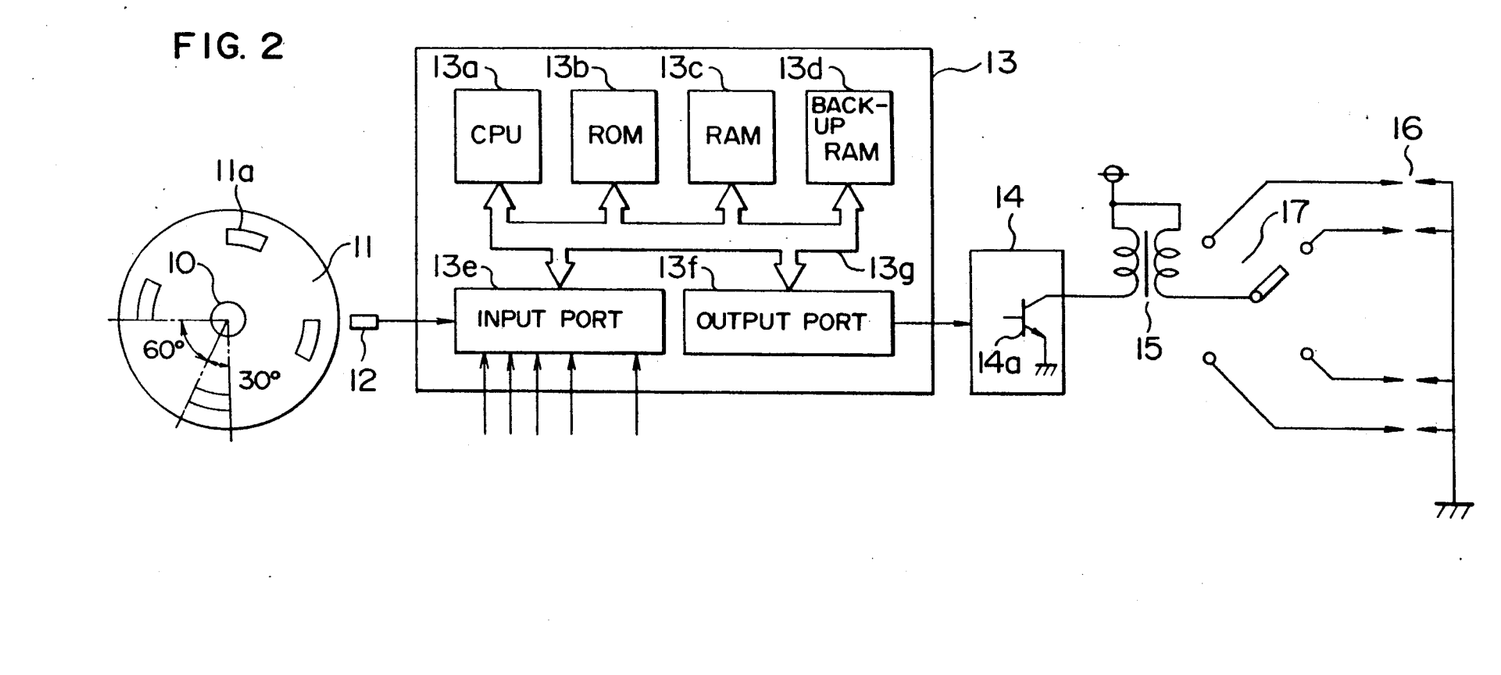
FIG. 2 is a schematic diagram showing the construction of an embodiment of the invention which is applied to a four-cylinder four-cycle engine.

Referring to FIG. 2, there is illustrated a schematic diagram showing the construction of the embodiment. Numeral 10 designates the rotary shaft of a distributor 17 mounted on a four-cycle four-cylinder engine (hereinafter referred to as an engine). Numeral 11 designates a disk mounted on the rotary shaft 10 for rotation in synchronism with the rotation of the rotary shaft 10 and a number of slits $11a$ (4 in this embodiment) corresponding to the number of the cylinders are formed at equal intervals in the peripheral portion of the disk 11. Numeral 12 designates a rotational angle sensor (e.g., a light sensor or Hall-effect sensor) for discriminating the presence of the slit $11a$ to generate a pulse signal. Numeral 13 designates an electronic control unit (ECU) formed as a mathematical logical operation circuit mainly by known central processing unit (CPU) $13b$, read-only memory (ROM) $13b$, random access memory (RAM) $13c$ and back-up RAM $13d$ which are in turn interconnected through an input port $13e$ for receiving the signals from various sensors, an output port $13f$ for outputting control signals to various actuators, etc., and a bus $13g$. Numeral 14 designates an igniter for driving a power transistor $14a$ in response to an ignition signal generated from the ECU 13, 15 an ignition coil in which the primary current is switched on and off by the power transistor $14a$, and 16 spark plugs of the respective cylinders which are connected to the secondary side of the ignition coil 15 through the distributor 17.

The electronic control unit 13 receives through the input port $13e$ an intake air flow, intake air temperature, cooling water temperature, rotational angles, etc., so that the ignition timing computed in terms of an angle on the basis of these inputs is converted to a time and a control signal is outputted to the igniter 14 through the output port $13f$.

The ignition timing control, particularly the estimation of an engine speed in the conversion of the computed ignition timing to a time will now be described.

Figure 3:
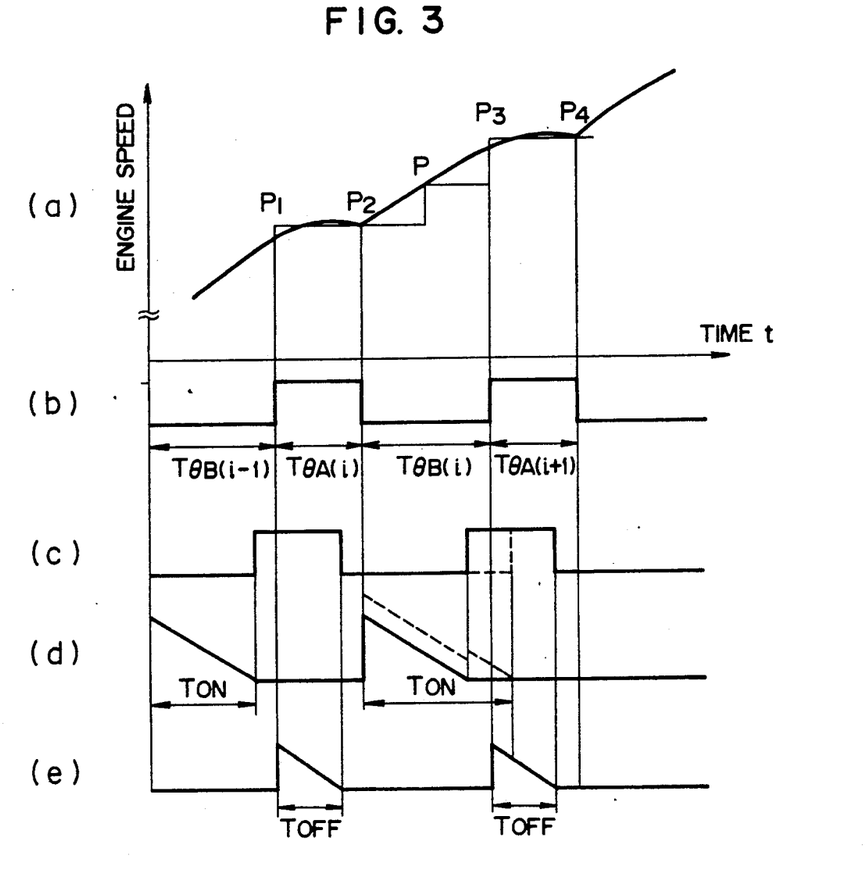

The inventors have measured the momentary engine speed variations during the acceleration condition on different engines and have obtained a characteristic as shown in FIG. 3. As will be seen from this characteristic diagram, a characteristic curve has been obtained in which the engine speed begins to rise starting at the respective top dead centers $P_2$ and $P_4$ immediately following the ignition and the engine speed becomes substantially constant during the interval between a pre-ignition angular point $P_1$ or $P_3$ dividing the angle of every ignition cycle $P_2$-$P_4$ at the ratio of 2:1 in angle and the top dead center $P_2$ or $P_4$ immediately following the ignition.

Then, in FIG. 3 the difference between the required rotation time $T\theta_{A(i)}/\theta_A$ for every crank angle during the second rotational angle $P_1$-$P_2$ with a small engine speed variation (substantially constant) in the preceding fired cylinder and the required rotation time $T\theta_{A(i+1)}/\theta_A$ for every crank angle during the second rotational angle $P_3$-$P_4$ in the current fired cylinder is due to the engine speed variation caused during the first rotational angle with a great engine speed variation or the interval $P_2$-$P_3$. Assuming now that $T\theta_{B(i)}$ represents the required rotation time during the interval $P_2$-$P_3$, the average value of the required rotation times for every crank angle during the interval is given by $T\theta_{B(i)}/\theta_B$. Here, from (a) of FIG. 3 it can be approximated that the engine speed increases at a uniform acceleration during the interval $P_2$-$P_3$ and therefore the average value $T\theta_{B(i)}/\theta_B$ corresponds to the intermediate point P of the interval $P_2$-$P_3$. Thus, the following expression holds $$T\theta_{A(i)}/\theta_A - T\theta_{B(i)}/\theta_B \doteq T\theta_{B(i)}/\theta_B - T\theta_{A(i+1)}/\theta_A$$

Modifying the above expression, we obtain $$T\theta_{A(i+1)} \doteq 2 \times T\theta_{B(i)} \times \frac{\theta_A}{\theta_B} - T\theta_{A(i)} \qquad (1)$$

Therefore, the required rotation time $T\theta_{A(i+1)}$ or engine speed during the interval $P_3$-$P_4$ can be estimated. In the four-cylinder engine incorporating this embodiment, by setting $\theta_A = 60°$ crank angle and $\theta_B = 12°$ crank angle, it is possible to divide every ignition cycle into a region of a large engine speed variation and a region of a small engine speed variation during the acceleration condition.

Thus, since the disk 11 rotates once for every two revolutions of the engine, each of the slits 11a corresponds to 30°.

Therefore, by substituting $\theta_A$ and $\theta_B$ into equation ①, we obtain the following simple computational expression $$T\theta_{A(i+1)} = T\theta_{B(i)} - T\theta_{A(i)}$$

Also, by modifying equation ①, we obtain $$T\theta_{A(i+1)} = T\theta_{A(i)} - 2 \times \left( T\theta_{A(i)} - T\theta_{B(i)} \times \frac{\theta_A}{\theta_B} \right)$$

where $$2 \times \left( T\theta_{A(i)} - T\theta_{B(i)} \times \frac{\theta_A}{\theta_B} \right)$$

is a correction value the acceleration condition. This correction value can also be used in the deceleration condition.

In the like manner, the estimation of $T\theta_{B(i+1)}$ can be made from the following equation $$\begin{aligned} T\theta_{B(i+1)} &= T\theta_{B(i)} - 2 \times \left( T\theta_{B(i)} - T\theta_{A(i)} \times \frac{\theta_B}{\theta_A} \right) \\ &= 2 \times T\theta_{A(i)} \times \frac{\theta_B}{\theta_A} - T\theta_{B(i)} \end{aligned}$$

As in the case of $T\theta_{A(i+1)}$, the above equation for $T\theta_{B(i+1)}$ can also be used in the deceleration condition.

Figure 4:
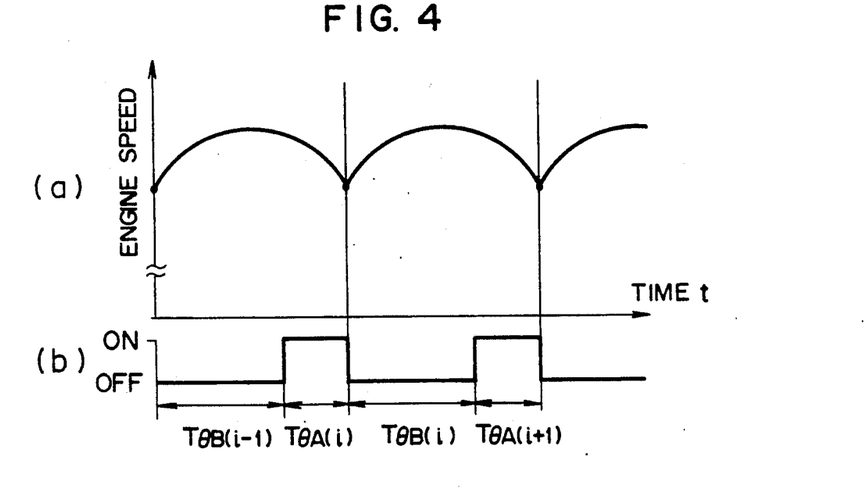

Also, when the correction value is small, it can be determined that the engine is in the steady-state condition. FIG. 4 shows an engine speed characteristic in the steady-state condition. Thus, while this correction value corresponds to the speed acceleration, it has been the practice in the past so that when the correction value is small or when the engine is in the steady-state condition, the correction value is set to 0 thus determining the following $$T\theta_{A(i+1)} = T\theta_{A(i)}$$

$$T\theta_{B(i+1)} = T\theta_{A(i)}$$

However, there is the occurrence of an engine speed variation and therefore the resulting error is increased for the short period of $T\theta_{A(i)}$.

Thus, in accordance with the present embodiment, during the steady-state condition the required rotational time $T\theta_{A(i)} + T\theta_{B(i)}$ of each ignition cycle is utilized to effect the estimation of $T\theta_{A(i+1)}$ and $T\theta_{B(i+1)}$. By so doing, it is possible to reduce the error due to the engine speed variation difference and to thereby improve the estimation accuracy of $T\theta_{A(i+1)}$ and $T\theta_{B(i+1)}$.

Therefore, during the steady-state condition the estimation of $T\theta_{A(i+1)}$ and $T\theta_{B(i+1)}$ is made from the following equations $$T\theta_{A(i+1)} = \{T\theta_{A(i)} + T\theta_{B(i)}\} \times \theta_A / (\theta_A + \theta_B)$$

$$T\theta_{B(i+1)} = \{T\theta_{A(i)} + T\theta_{B(i)}\} \times \theta_B / (\theta_A + \theta_B)$$

Next, the ignition timing control operation of the electronic control unit 13 will be described with reference to the flow chart of FIG. 5.

This routine is an interrupt processing routine which is executed each time the input signal from the rotational angle sensor 12 goes to a high level or a low level.

Firstly, at a step 100, it is determined whether the interrupt is initiated by the input signal going to the high level or the low level. If it is determined at the step 100 that the interrupt is initiated by the input signal going to the low level, the value of $T\theta_{A(i)}$ is measured and stored at a step 101. Since the time of occurrence of the interrupt is stored in a given register, the measurement of $T\theta_{A(i)}$ can be effected by subtracting the time of occurrence of the preceding interrupt from the time of occurrence of the current interrupt.

Then, at a step 102, it is determined whether the engine is in the transitional condition or the steady-state condition. This determining method may for example be as follows $$\left| T\theta_{A(i)} - \frac{1}{2} T\theta_{B(i)} \right| > k \times T\theta_{A(i)}$$

or $$| T\theta_{A(i)} - T\theta_{A(i)} | > k$$

where k is a constant.

When this inequality holds, it can be determined that the engine is in the transitional condition.

When it is determined at the step 102 that the engine is in the transitional condition, a transfer is made to a step 103 where the estimation of $T\theta_{B(i+1)}$ is effected from the following equation by using the previously measured and stored $T\theta_{A(i)}$ and $T\theta_{B(i)}$ $$T\theta_{B(i+1)} = 4 \times T\theta_{A(i)} - T\theta_{B(i)}$$

On the contrary, when it is determined that the engine is in the steady-state condition, a transfer is made to a step 104 where the estimation of $T\theta_{B(i+1)}$ is made in the similar manner from the following equation $$T\theta_{B(i+1)} = \frac{2}{3} \times \{T\theta_{A(i)} + T\theta_{B(i)}\}$$

Then, at a step 105, a timing $T_{ON}$ for switching on an ignition control signal is set in accordance with the $T\theta_{B(i+1)}$ estimated at the step 103 or 104. The setting method is such that if an ignition signal is generated at a rotational angle of $\theta_{ig}°$ crank angle before the top dead centers $P_2$ and $P_4$, respectively, and if $T_{DWL}$ represents a predetermined igniter control time (e.g., 5 msec), the timing $T_{ON}$ is set from the following equation $$T_{ON} = \frac{T\theta_{B(i)}}{\theta_B} \times \{(\theta_A + \theta_B) - Q_{ig}\} - T_{DWL}$$

On the other hand, if it is determined at the step 100 that an interrupt is initiated by the input signal going to the low level, a transfer is made to a step 106 where the value of $T\theta_{B(i)}$ is measured and stored. At this time, the same measuring method as that of the step 101 is used.

At the following step 107, it is determined whether the engine is in the transitional condition or the steady-state condition. The determining method is the same as used at the step 102. If it is determined at the step 107 that the engine is in the transitional condition, the estimation of $T\theta_{A(i+1)}$ is made at a step 108 from the following equation in the like manner as the steps 103 and 104, respectively $$T\theta_{A(i+1)} = T\theta_{B(i)} - T\theta_{A(i)}$$

On the contrary, if it is determined at the step 107 that the engine is in the steady-state condition, the estimation of $T\theta_{A(i+1)}$ is made at a step 109 from the following equation in the like manner as the steps 103, 104 and 108, respectively $$T\theta_{A(i+1)} = \frac{1}{3} \{T\theta_{A(i)} + T\theta_{B(i)}\}$$

At the following step 110, it is determined whether the igniter control signal is on or off. At this time, if the igniter control signal is off, that is, if the igniter control signal is not switched on as yet as shown by the broken line in (d) of FIG. 3 at the time that the input signal from the rotational angle sensor 12 goes to the high level, the timing $T_{ON}$ is set again at a step 111. This resetting is effected according to the following equation $$T_{ON} = \frac{T\theta_{A(i+1)}}{\theta_A} \times (\theta_A - Q_{ig}) - T_{DWL}$$

Then, the setting of $T_{OFF}$ is effected at a step 112. This setting is effected according to the following equation $$T_{OFF} = \frac{T\theta_{A(i+1)}}{\theta_A} \times (\theta_A - Q_{ig})$$

Lastly, the timing $T_{ON}$ or $T_{OFF}$ set at the step 105 or the steps 111 and 112 is set in a timer.

Thus, in accordance with the present embodiment, an engine speed or $T\theta_{A(i+1)}$ is estimated by utilizing the pulse duration times $T\theta_{A(i)}$ and $T\theta_{B(i)}$ which are measurable during the ignition cycle of the preceding cylinder. Thus, it is possible to provide a transitional correction starting from the ignition immediately following the engine coming into a transitional condition and a highly accurate ignition timing control can be performed immediately following the engine coming into the transitional condition. Also, the provision of a correction is effected during the steady-state condition so that the estimation of $T\theta_{A(i+1)}$ can be made with a high degree of accuracy and the ignition timing control is enhanced even during the steady-state condition. Also, the estimation of $T\theta_{A(i+1)}$ and $T\theta_{B(i+1)}$ during the transitional condition can be made from the following simple computational expressions.

$$T\theta_{A(i+1)} = T\theta_{B(i)} - T\theta_{A(i)}$$

$$T\theta_{B(i+1)} = 4 \times T\theta_{A(i)} - T\theta_{B(i)}$$

Similarly, the estimation of $T\theta_{A(i+1)}$ and $T\theta_{B(i+1)}$ can be made from the following expressions $$T\theta_{A(i+1)} = \frac{1}{3} \{T\theta_{A(i)} + T\theta_{B(i)}\}$$

$$T\theta_{B(i+1)} = \frac{1}{3} \{T\theta_{A(i)} + T\theta_{B(i)}\}$$

Thus, the software processing burden on the electronic control unit 13 can be reduced.

While, in the present embodiment, the rotational angle detecting means includes the element to be detected provided by the disc 11 formed with the slits 11a and the detecting element provided by the rotational angle sensor, it is possible to employ another embodiment of the rotational angle detecting means including an element to be detected provided by a dielectric disc formed with projections and a detecting element provided by an electromagnetic pickup, and also the angular points $P_1$ and $P_2$ may each be detected by a separate sensor.

Further, while, in the present embodiment, during the steady-state condition the estimation of $T\theta_{A(i+1)}$ and $T\theta_{B(i+1)}$ is made in accordance with the ratio $\theta_A/\theta_B$ with respect to the required time for each ignition cycle, it is possible to effect the estimation according to the following as with the conventional techniques.

$$T\theta_{A(i+1)} = T\theta_{A(i)}$$

$$T\theta_{B(i+1)} = T\theta_{B(i)}$$

Figure 5:
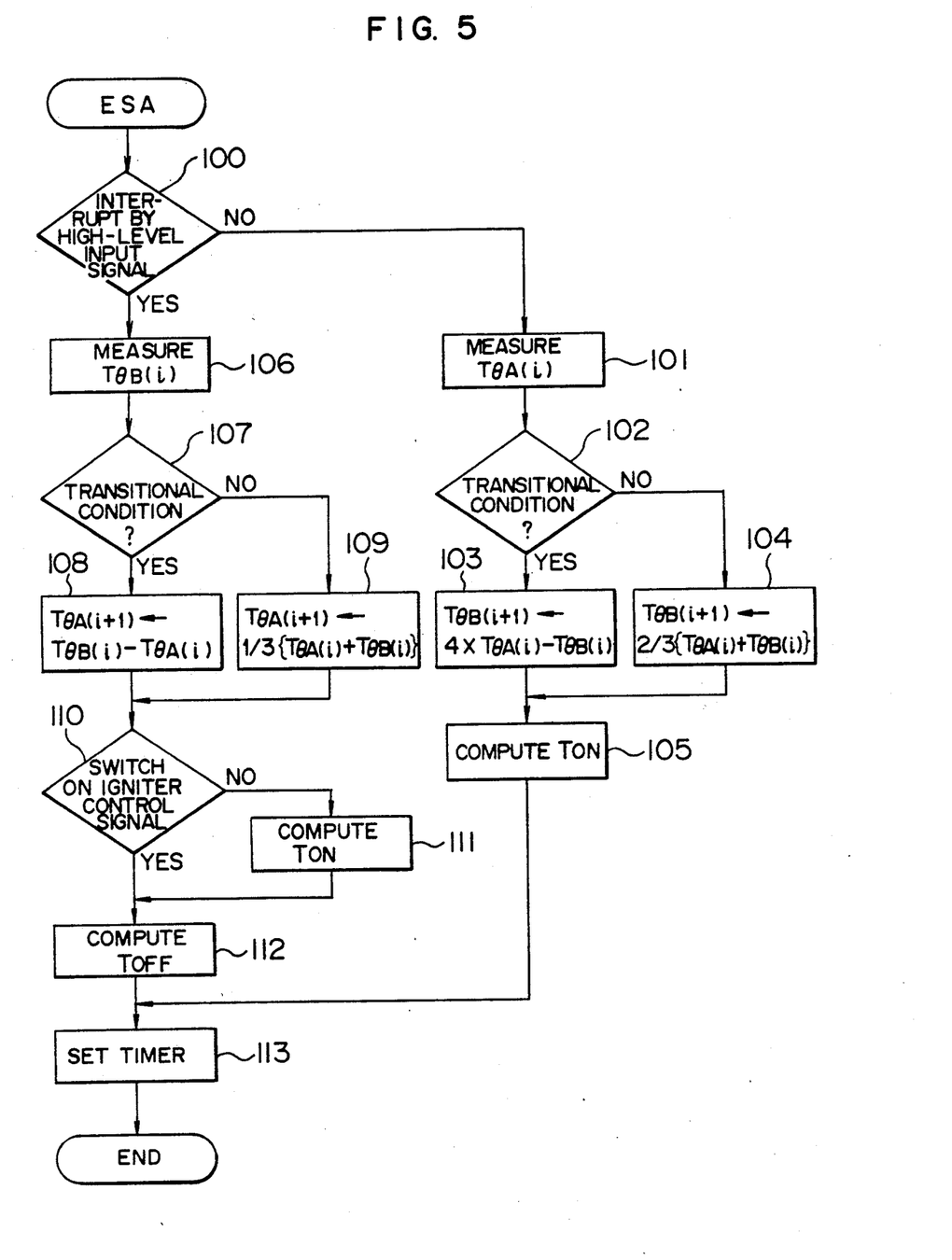
FIG. 5 is a flow chart for explaining the operation of the embodiment.
Figure 6:
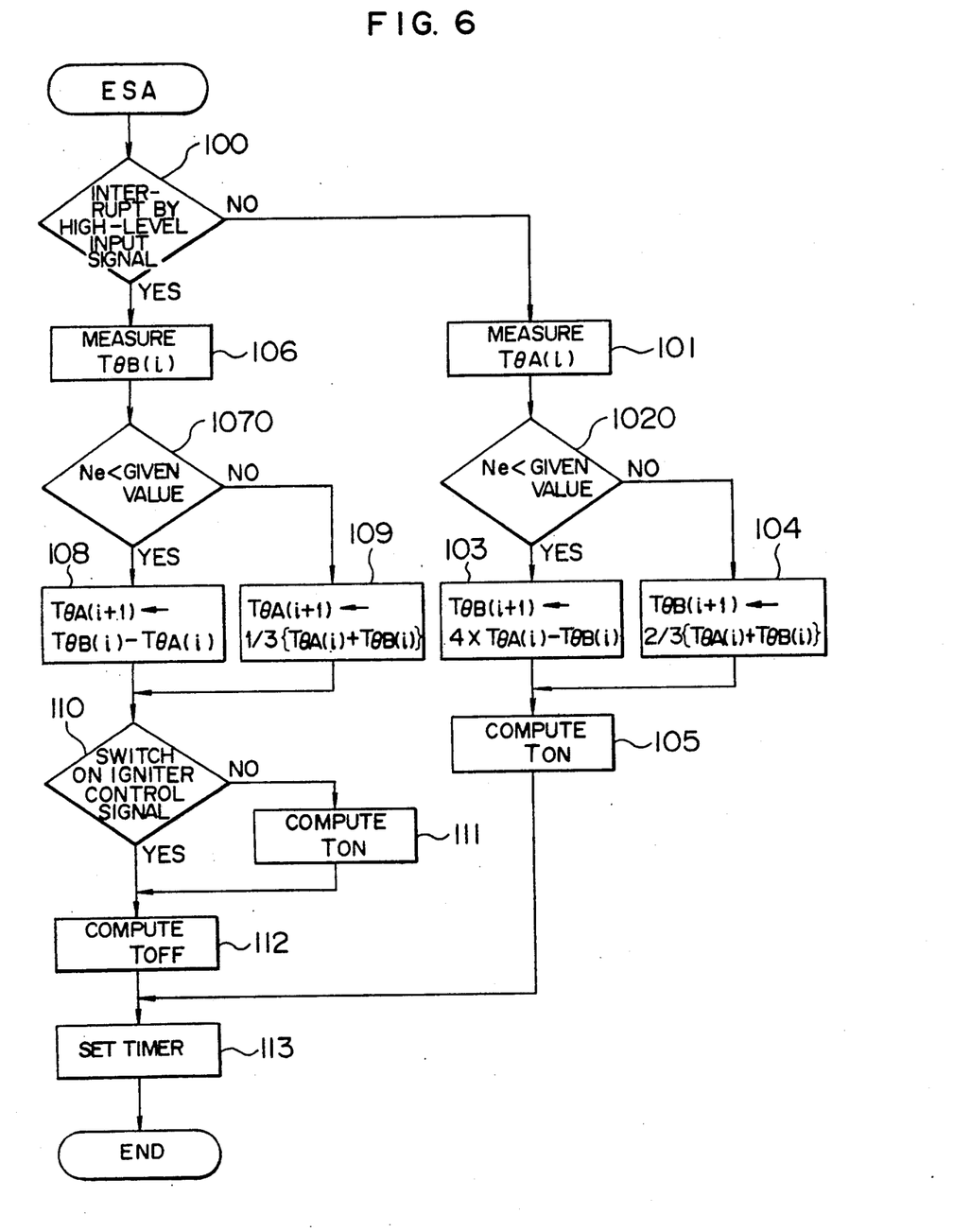
FIG. 6 is a flow chart for explaining the operation of another embodiment of the present invention.

Still further, in the present embodiment the determination of a transitional condition is effected at the step 102 or 107 to effect the switching between the estimating means as shown in FIG. 5. However, the deterioration of the ignition timing control accuracy during the transitional condition appears remarkably at low engine speeds where the engine speed variation during each ignition cycle is large. Thus, the switching between the estimating means may be effected depending on whether the engine speed Ne is lower than a given engine speed as shown at the step 1020 or 1070 in FIG. 6.

Then, in the case of engines other than the four-cylinder engines, the ratio $\theta_A/\theta_B$ for the rotational angles in each ignition cycle may preferably be set to 1:2. However, this cannot be realized if the number of cylinders is increased and the value of $\theta_A$ is smaller than the maximum advance angle. Thus, in order to ensure the maximum advance angle, the ratio between $\theta_A$ and $\theta_B$ is set to 1:1 in the case for example of a six-cylinder engine. By so doing, the accuracy can be enhanced somewhat, although the accuracy is deteriorated as compared with the case where the ratio between $\theta_A$ and $\theta_B$ is set to 1:2.

Figure 7:
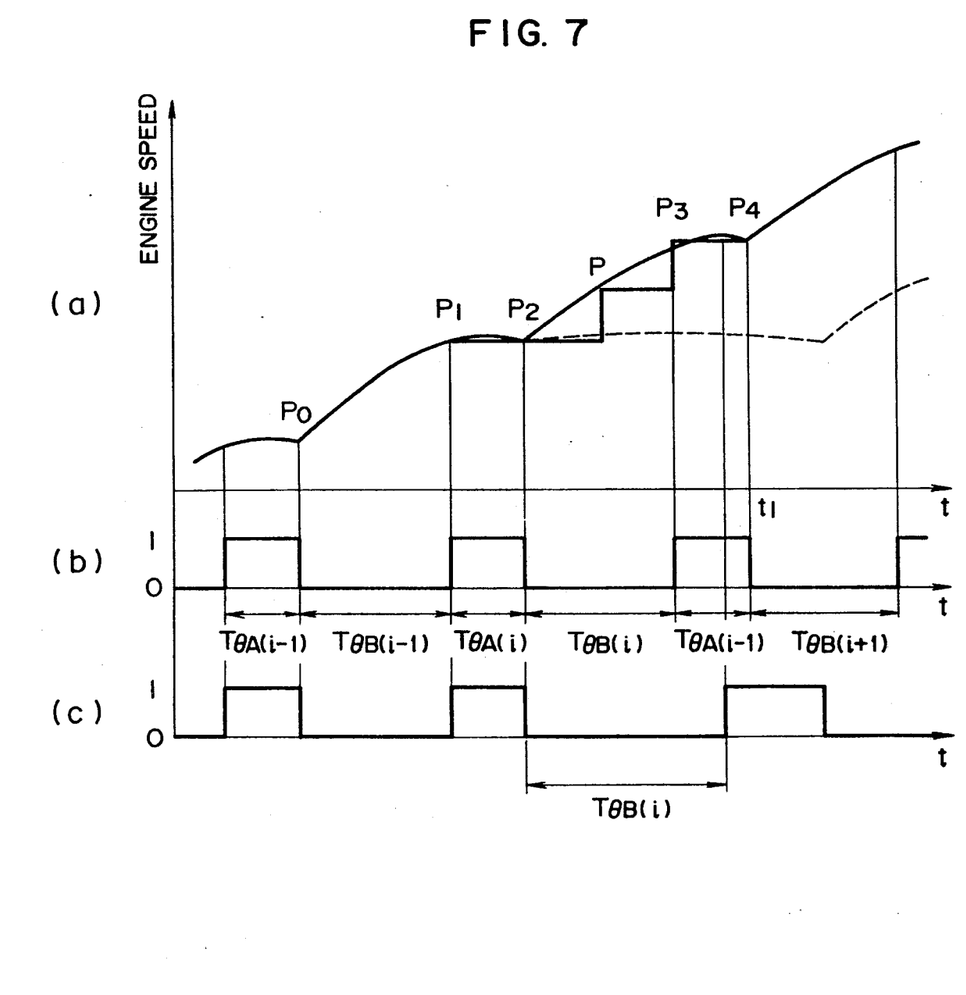
Figure 8:
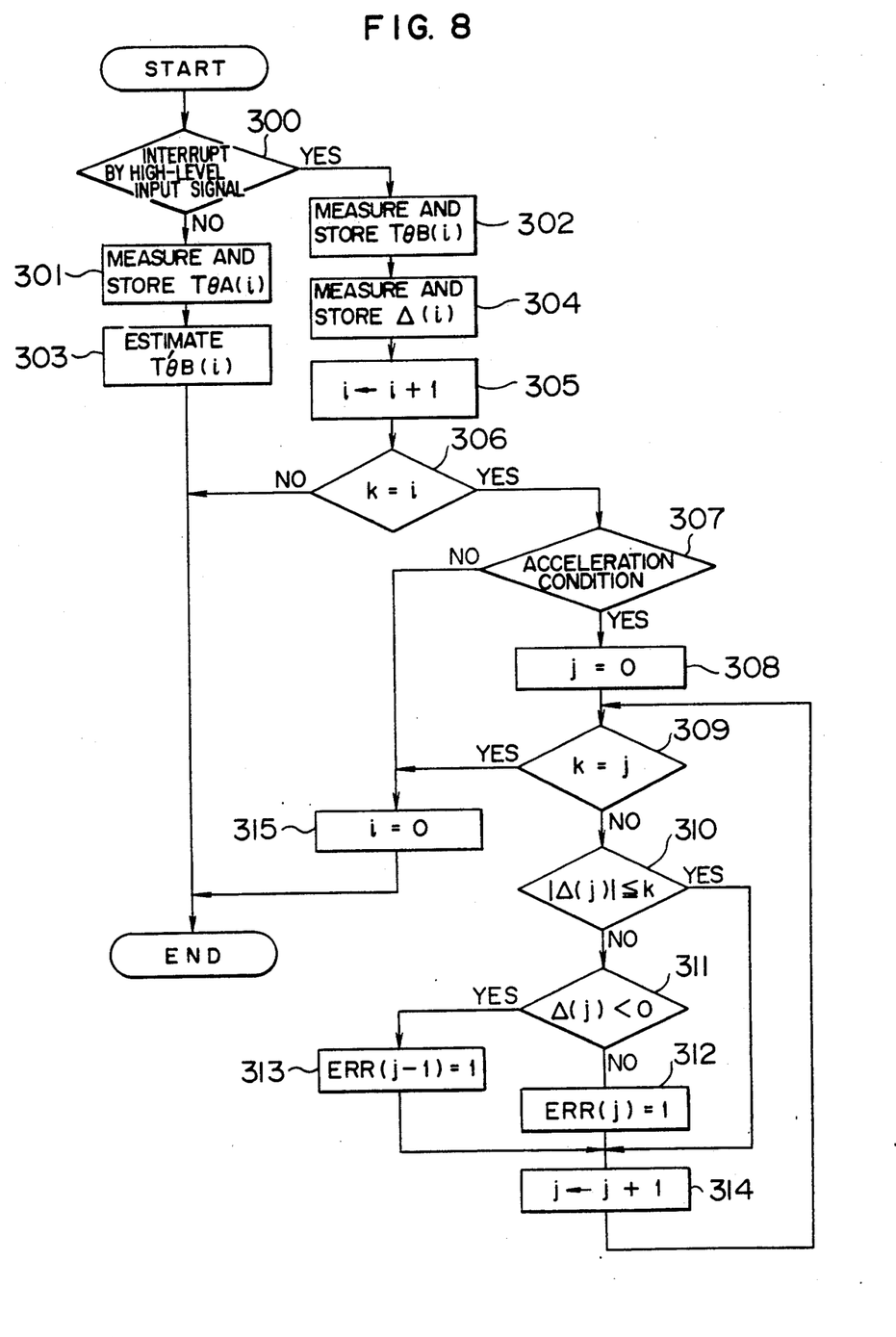
FIG. 8 is a flow chart for explaining the operation of the embodiment of FIG. 7.

Next, another embodiment of the present invention will be described with reference to FIGS. 7 and 8. FIG. 7 shows a timing chart similar to FIG. 3.

Here, when a fault occurs thus causing a misfire during the acceleration condition of the engine, the resulting engine speed characteristic becomes as shown by the broken line in (a) of FIG. 7. As will be seen from the characteristic, the occurrence of a fault does not result in an increase in the engine speed. Thus, a first rotational angle time $T\theta_{B(i)}$ is increased as shown in (c) of FIG. 7. As a result, the fault can be detected by the deviation between a first rotational angle time $T'\theta_{B(i)}$ estimated from equation ① and the actual first rotational angle time $T\theta_{B(i)}$.

Then, even during the steady-state condition of the engine, the engine speed is decreased due to a fault. However, this decrease is not caused as remarkably as during the acceleration condition of the engine. Thus, in accordance with the present embodiment the detection of a faulty cylinder is effected only during the acceleration condition of the engine.

The ignition timing control operation of the electronic control unit 13 will now be described with reference to the flow chart of FIG. 8.

This routine is an interrupt processing routine which is executed each time the input signal from the rotational angle sensor 12 goes to the high level or the low level.

First, rotational angle times $T\theta_{A(i)}$ and $T\theta_{B(i)}$ are detected in accordance with the input signal at steps 300 to 302. At the step 300, it is determined whether the interrupt is initiated by the input signal going to the high level or the low level. If it is determined at the step 300 that the interrupt is initiated by the input signal going to the low level, a second rotational angle time $T\theta_{A(i)}$ is measured and stored at the step 301. Since the time of occurrence of the interrupt is stored in a given register, the measurement of the second rotational angle time $T\theta_{A(i)}$ can be effected by subtracting the time of occurrence of the preceding interrupt from the time of occurrence of the current interrupt.

On the other hand, if it is determined at the step 300 that the interrupt is initiated by the input signal going to the high level, a first rotational angle time $T\theta_{B(i)}$ is measured and stored. The measurement of the first rotational angle time $T\theta_{B(i)}$ is also effected in the like manner as the previously mentioned second rotational angle time $T\theta_{A(i+1)}$.

Then, when the interrupt is initiated by the input signal going to the low level at the step 300, a transfer is made to a step 103 where an estimated value $T'\theta_{B(i)}$ of the first rotational angle time $T\theta_{B(i)}$ is obtained and stored from equation ① by using the second rotational angle time $T\theta_{A(i)}$ measured at the step 301 and the first rotational angle time $T\theta_{B(i-1)}$ measured by the preceding interrupt processing. In accordance with the present embodiment, it is set that $\theta_A = 60°$ crank angle and $\theta_B = 120°$ crank angle as mentioned previously and therefore the estimated value $T'\theta_{B(i)}$ can be determined from the following equation $$T'\theta_{B(i)} = 4 \times T\theta_{A(i)} - T\theta_{B(i-1)}$$

On the contrary, if the interrupt is initiated by the input signal going to the high level at the step 300, the detection of a fault is effected at steps 304 to 314.

First, at the step 304, the deviation $\Delta(i)$ between the $T\theta_{B(i)}$ measured at the step 302 and the estimated value $T'\theta_{B(i)}$ estimated by the preceding interrupt processing is obtained and stored in accordance with the following equation $$\Delta(i) = T'\theta_{B(i)} - T\theta_{B(i)}$$

In accordance with the present embodiment the detection of the acceleration operation is effected in accordance with variations in the rotational angle time of a given rotational angle during continuous k times of ignition. Here, k is a given constant. It should preferably be set to an integral multiple of the number of cylinders (e.g., 8 in the present embodiment) so as to effect the same number of fault detections on each of the cylinders. As a result, the fault detection processing of steps 307 to 315, which will be described later, is also effected every k times of ignition. Thus, if the ignition is effected k times since the preceding fault detection processing is detected at steps 305 and 306. First, 1 is added to a variable i at the step 305. The step 305 is performed once for every ignition. In other words, the variable i represents the number of times of ignition. Then, the variable i is detected at the step 306. If the variable i is equal to k, that is, if the ignition has been effected k times since the preceding fault detection processing, a transfer is made to the step 307.

Then, at the step 307, it is determined whether the engine has been in the acceleration condition during the past k ignition events. The method of determining the acceleration condition of the engine may for example be such that in accordance with the present embodiment, it is determined that the engine is accelerating when the difference between the rotational angle time of a given rotational angle (e.g., 180° crank angle = $T\theta_A + T\theta_B$) before a given ignition and the rotational angle time of the given rotational angle for the current ignition is greater than a given value l.

In other words, since the rotational angle time of the given rotational angle before the given ignition is $T\theta_{A(0)} + T\theta_{B(0)}$ and the rotational angle time of the given rotational angle for the current ignition is $T\theta_{A(k-1)} + T\theta_{B(k-1)}$, if the engine is in the acceleration condition is determined depending on whether the following expression holds $$l \leq \{T\theta_{A(0)} + T\theta_{B(0)}\} - \{T\theta_{A(k-1)} + T\theta_{B(k-1)}\}$$

If the above expression does not hold or when the engine is not accelerating, a transfer is made to the step 315. On the contrary, if the above expression holds, that is, the engine is accelerating, a transfer is made to the step 308.

The steps 308, 309 and 314 are operations for performing the given number of times of k times the processing of the steps 310 to 313 which will be described later.

First, at the step 308, a variable j is reset (j=0). Then, at the step 309, it is determined whether the variable j is equal to the given number of times k.

If the variable j is not equal to the given value K, the detection of a fault is effected at the step 310 in accordance with the deviation $\Delta(j)$ determined and stored at the step 304. More specifically, the detection of a fault is effected depending on whether the absolute value of $\Delta(j)$ is greater than a given value K as mentioned previously. As a result, the fault detection is effected depending on whether the following expression holds $$|\Delta(j)| \leq K$$

Then, if the above expression holds, it is determined that there is no fault and a transfer is made to the step 314. On the contrary, if the above expression does not hold, it is determined that there is a fault and which of the cylinders is faulty is detected at the steps 311 to 313.

First, at the step 311, the sign of $\Delta(j)$ determined at the step 304 is detected. If the deviation $\Delta(j)$ is negative, it is due to the fact that there was no increase in the engine speed during the interval $P_2-P_3$ in FIG. 7. In other words, it is determined that the cylinder corresponding to the jth ignition is faulty and a flag ERR(j) indicating the fault in the cylinder corresponding to the jth ignition is set (ERR(j)=1) at the step 312. On the contrary, if the deviation Δ(j) is positive, it is due to the fact that there was no increase in the engine speed during the interval $P_0$-$P_1$ in FIG. 7. In other words, it is determined that there is a fault in the cylinder corresponding to the (j-1)th ignition and a flag ERR(j-1) indicating the fault in the cylinder corresponding to the (j-1)th ignition is set (ERR(j-1)=1).

At the next step 314, 1 is added to the variable j. Then, the previously mentioned processing of the steps 309 to 314 is performed.

Also, if the variable j is equal to the given number of times k at the step 309, that is, when the processing of the steps 310 to 314 is performed k times, the variable i is reset (i=0) at the step 115 thus ending the processing.

Then, a processing is performed so as to inhibit for example the supply of fuel to the faulty cylinder detected in the previously mentioned processing.

As described hereinabove, the detection of a faulty cylinder is effected in accordance with the rotational angle times. Thus, the detection of a faulty cylinder can be positively effected with respect to faults in the secondary side of the ignition coil, the fuel system, etc.

Also, every ignition cycle is divided into a first rotational angle with a large engine speed variation and a second rotational angle with a small engine speed variation and the detection of a faulty cylinder is effected in accordance with the corresponding first rotational angle time and second rotational angle time.

Thus, the present embodiment can also be applied to engines employing a crank angle sensor generating a limited number of pulses.

Further, while, in the present embodiment, the detection of a faulty cylinder is effected in accordance with the data for every ignition at the steps 309 to 314, in accordance with the data for every ignition the detection of a fault in the cylinder corresponding to the current ignition or the preceding ignition can be effected and therefore the detection of a faulty cylinder can be effected in accordance with the data for every two ignition events.

Still further, while, in the present embodiment, the detection of a fault is effected in accordance with the deviation Δ(i) between the estimated first rotational angle time $T'\theta_{B(i)}$ and the actual first rotational angle time $T\theta_{B(i)}$, it is possible to detect a fault in accordance with a first unit rotational angle time $T\theta_{B(i)}/\theta_B$ for 1° crank angle with respect to the first rotational angle $\theta_B$ and a second unit rotational angle time $T\theta_{A(i)}/\theta_A$ for 1° crank angle with respect to the second rotational angle $\theta_A$.

In other words, as will be seen from (a) of FIG. 7, the following equation holds during the acceleration condition $$\Delta l(i) = T\theta_{A(i)}/\theta_A - T\theta_{B(i)}/\theta_B \geq M$$

Here, M is a given value. However, if a misfire is caused by the fault, as shown in (c) of FIG. 7, the first rotational angle time $T\theta_{B(i)}$ increases and therefore the above equation does not hold.

Therefore, it is possible to detect the occurrence of a fault in the fired cylinder when a relation Δl(i)<M holds.

Figure 9:
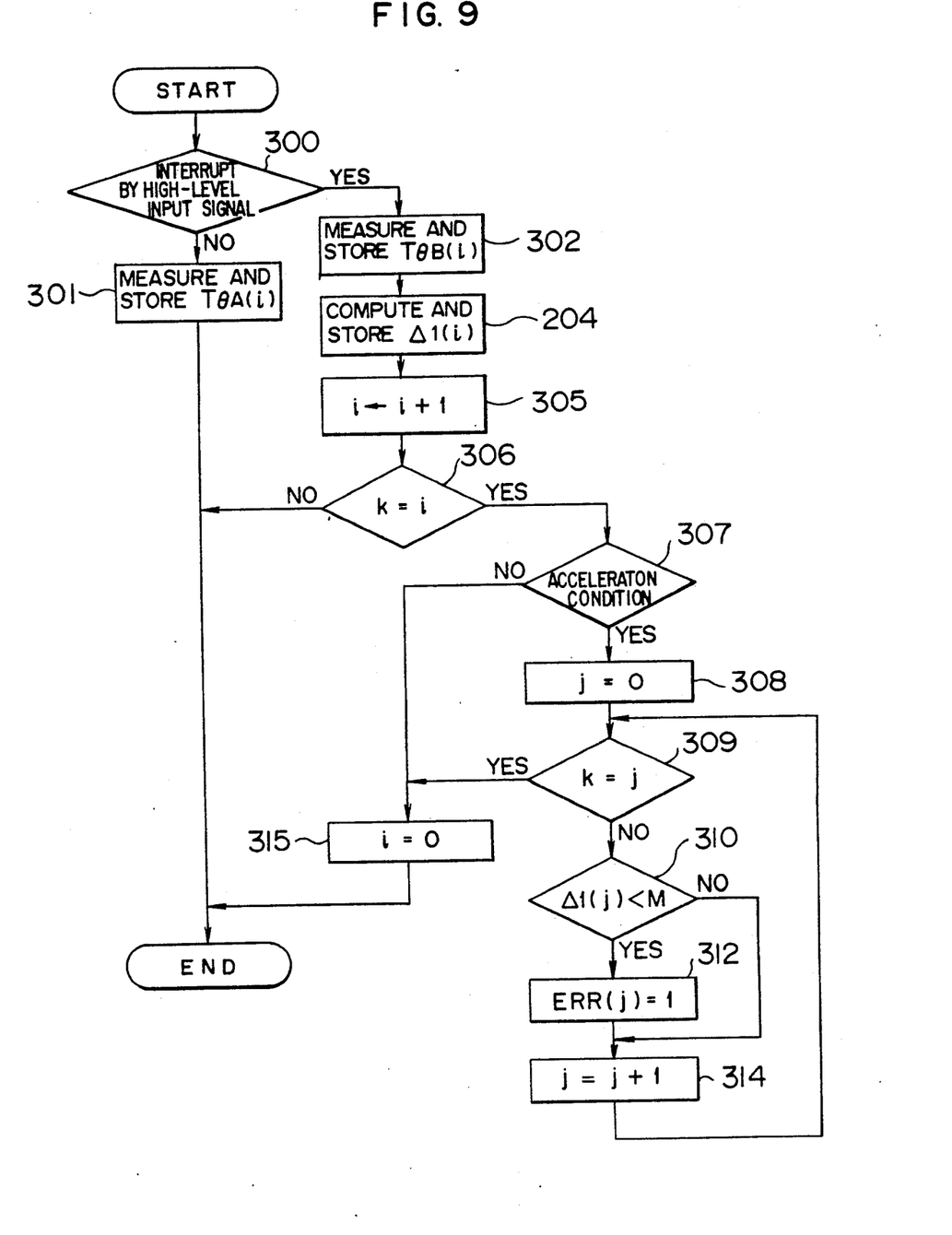
FIG. 9 is a flow chart for explaining the operation of still another embodiment of the present invention.

FIG. 9 shows a flow chart for such case. At a step 204, the value of Δl(i) is computed and stored according to the following equation $$\Delta l(i) = T\theta_{A(i)}/\theta_A - T\theta_{B(i)}/\theta_B$$

Then, at a step 210, it is determined whether the value of Δl(i) is less than the given value M so that if Δl(i) is less than the given value M, it is determined that the cylinder in question is faulty.

Then, since such engine speed characteristic as shown in (a) of FIG. 7 is apparent at low engine speeds, the detection accuracy can be improved by effecting the detection of a faulty cylinder only at engine speeds lower than a given rpm.

Also, even in the case of engines other than the four-cylinder engines, the ratio between $\theta_A$ and $\theta_B$ should preferably be set to 1:2 for the rotational angles in every ignition cycle. However, since this cannot be realized if the number of cylinders increases and if the value of $\theta_A$ becomes less than the maximum advance angle, in order to ensure the maximum advance angle, the ratio between $\theta_A$ and $\theta_B$ is set to 1:1 in the case for example of six-cylinder engines. While this deteriorates the accuracy of rotational angle time estimation as compared with the case where the ratio between $\theta_A$ and $\theta_B$ is set to 1:2, this deterioration is not so large as to produce any effect on the detection of faulty cylinders.

Although the above embodiment is implemented for the detection of faults with respect to a multi-cylinder engine in an accelerated condition, it is possible to further implement for the detection of such faults in a steady-state operating condition.

Although the foregoing embodiments use the rotational angle detector comprising a disk provided with slits of the number of the cylinders, it is possible to increase the number of the slits more than that of the cylinders by dividing one ignition cycle into first and second rotational angles.

I claim:

1. An ignition timing control apparatus for an engine comprising:

means for detecting rotational angles of the engine under an engine acceleration condition to generate a first signal at a first rotational angle of the engine which bonds between a first rotational angle period of an ignition cycle during which an engine speed change is high and a second rotational angle period of said cycle curing which said engine speed change is lower, said first rotational angle marking a change of engine speed from said small change to said large change, and to generate a second signal at a second rotational angle which bounds between said second rotational angle period and said first rotational angle period, said second rotational angle marking a change of engine speed from said large change to said small change;

rotation time interval detecting means for detecting a first rotation time interval which is a time interval beginning at the generation of said first signal and ending at the generation of said second signal, and for detecting a second rotation time interval which is a time interval beginning at the generation of said second signal and ending at the generation of said first signal;

first estimating means for estimating a next second rotation time interval for another ignition cycle of said engine in accordance with said detected first and second rotation time intervals during said engine acceleration condition, wherein said engine approximately makes a uniform acceleration motion during said first rotation interval; and first setting means responsive to said second rotation time interval estimated by said first estimating means to set a timing for generating an ignition signal.

2. An apparatus according to claim 1, wherein said first estimating means estimates said next second rotation time interval for a current ignition cycle in accordance with said second rotation time interval in a preceding ignition cycle and a first rotational time interval in said current ignition cycle.

3. An apparatus according to claim 1, further comprising:

engine state determining means for determining whether said engine is in a transitional condition in which said intervals are variable or a steady-state condition in which said intervals are substantially constant, in accordance with said detected first and second rotation time intervals detected by said rotational angle detecting means;

second estimating means for detecting a time required for one ignition cycle to estimate a second rotation time interval in accordance with said required time and a ratio of said second signal rotational angle to one-ignition-cycle angle; and first selecting means for controlling said first and second estimating means such that said first estimating means estimates a second rotation time interval when said engine state determining means determines that said engine is in the transitional condition and said second estimating means estimates a second rotation time interval when said engine state determining means determines that said engine is in the steady-state condition.

4. An apparatus according to claim 3, further comprising second selecting means for selecting said first and second estimating means in such a manner that said first estimating means estimates a second rotation time interval when the number of revolutions of said engine is lower than a given number of revolutions and said second estimating means estimates a second rotation time interval when said number of revolutions is higher than said given number of revolutions.

5. An apparatus according to claim 1, further comprising:

third estimating means for, during said engine acceleration condition in which said engine approximately makes a uniform acceleration motion during a period of said first signal, providing an acceleration correction in accordance with said detected first and second rotation time intervals and said first and second signals to thereby estimate a first rotation time interval; and second setting means for setting a time of starting current flow in a primary winding of an ignition coil in accordance with said first rotation time interval estimated by said third estimating means.

6. An apparatus according to claim 5, wherein said third estimating means estimates a first rotation time interval in said another ignition cycle in accordance with the first and second signal rotational angles in a current ignition cycle.

7. An apparatus according to claim 5 further comprising:

fourth estimating means for detecting a time required for one ignition cycle to estimate a first rotation time interval in accordance with said required time and a ratio of said first signal rotational angle to one-ignition-cycle angle; and third selecting means for selecting said third and fourth estimating means in such a manner that said third estimating means estimates a first rotation time interval when said determining means determines that said engine is in a transitional condition and said fourth estimating means estimates a first rotation time interval when said determining means determines that said engine is in a steady-state condition.

8. An apparatus according to claim 7, further comprising fourth selecting means for selecting said third and fourth estimating means in such a manner that said third estimating means estimates a first rotation time interval when the number of revolutions of said engine is lower than a given number of revolutions and said fourth estimating means estimates a first rotation time interval when said engine rotation speed is higher than said given number of revolutions.

9. An apparatus according to claim 1, wherein said first setting means comprises:

ignition timing setting means for setting an ignition timing in terms of a crank angle in accordance with an operating condition of said engine; and converting means for converting the crank angle corresponding to said ignition timing to a time in accordance with said estimated second rotation time interval.

10. An apparatus according to claim 1, wherein each said ignition cycle is defined by an angle between successive top dead centers of each cylinder of said engine, wherein said second signal rotational angle is of ½ or less of one ignition cycle angle before top dead center, and wherein said first signal rotational angle is an angle left when said second signal rotational angle is subtracted from one ignition cycle angle.

11. An apparatus according to claim 1, wherein said second signal rotational angle is substantially ⅓ or less of one ignition cycle angle before top dead center, and wherein said first signal rotational angle is an angle left when said second signal rotational angle is subtracted from one ignition cycle angle.

12. A control apparatus for an engine comprising:

rotational angle detecting means adapted for operation during an acceleration condition of an engine in which each ignition cycle is detected by dividing the same into a first rotational angle interval where an engine speed variation is large and a second rotational angle interval where an engine speed variation is smaller than during said first rotational angle interval;

rotation time interval detecting means for detecting first and second rotation time intervals respectively corresponding to time intervals of said first and second rotational angle intervals; and faulty cylinder detecting means for detecting at least one faulty cylinder of said engine in accordance with said first and second rotation time intervals detected by said rotation time interval detecting means.

13. An apparatus to claim 12, wherein said faulty cylinder detecting means comprises:

rotational angle estimating means, adapted for operation during said engine acceleration condition while said engine approximately makes a uniform acceleration motion during said first signal rotational angle, to estimate a first rotation time interval in a next ignition cycle in accordance with said detected first and second rotation time intervals and first and second signal rotational angles; and first fault detecting means for detecting said faulty at least one cylinder of said engine in accordance with said detected first rotation time interval and said estimated first rotation time interval.

14. An apparatus according to claim 12, wherein said faulty cylinder detecting means comprises:

unit rotation time interval detecting means for detecting a first unit rotation time interval related to said first signal rotational angle in accordance with said detected first rotation time interval and a second unit rotation time interval related to said second signal rotational angle in accordance with said detected second rotation time interval; and second fault detecting means for detecting said faulty cylinders of said engine in accordance with said first unit rotation time interval and said second unit rotation time interval.

15. An apparatus according to claim 12, wherein each said ignition cycle is substantially defined by an angle between successive top dead centers of each cylinder, wherein said second signal rotational angle is ⅓ or less of each said ignition cycle angle before top dead center, and wherein said first signal rotational angle is an angle left when said second signal rotational angle is subtracted from one ignition cycle angle.

16. An apparatus according to claim 12, wherein said second signal rotational angle is substantially ⅓ of one ignition cycle before top dead center, and wherein said first signal rotational angle is an angle left when said second signal rotational angle is subtracted from one ignition cycle.

17. An ignition timing control apparatus for an engine comprising:

rotational angle detecting means adapted for operation during an acceleration condition of an engine in which each ignition cycle is detected by dividing said each ignition cycle into a first rotational angle interval during which an engine speed variation is large and a second rotational angle interval during which an engine speed variation is smaller than during said first rotational angle interval;

rotation time interval detecting means for detecting first and second rotation time intervals respectively corresponding to time intervals of said first and second rotational angle intervals;

first estimating means adapted for operation during said engine acceleration condition in which said engine approximately makes a uniform acceleration motion, and for providing an acceleration correction in accordance with said detected first and second rotation time intervals and first and second rotation angle intervals and to thereby estimate a second rotation time interval other than said detected second rotation time interval detected by said rotation time interval detecting means;

first setting means responsive to said second rotation time interval estimated by said first estimating means to set a timing for generating an ignition signal; and faulty cylinder detecting means for detecting at least one faulty cylinder of said engine in accordance with said first and second rotation time intervals.

18. An ignition timing control apparatus for an engine comprising:

angle detection means for outputting a first detection signal substantially at top dead center of each cycle of cylinder stroke and outputting a second detection signal at a specific rotational angle preselected between top dead centers of first and second successive cylinder stroke cycles;

time interval detection means for detecting a first time interval beginning at the outputting of the first detection signal during said first cycle until the outputting of the second detection signal during said first cycle and for detecting a second time interval beginning at the outputting of the second detection signal until the outputting of the first time interval for said second cycle of cylinder stroke;

estimation means for estimating the second time interval in said second cycle of cylinder stroke in response to the first and the second time intervals detected by said time interval detection means;

ignition timing setting means for setting a crank angle for an ignition timing in response to the engine operating conditions; and conversion means for converting the crank angle corresponding to the ignition timing into a corresponding timing signal in response to the second time interval estimated by said estimation means.

19. An apparatus according to claim 18, wherein said specific rotation angle is preselected to divide half a rotation angle between the top dead center angular positions of successive cylinder stroke cycles.

20. An apparatus according to claim 18, wherein said specific rotation angle is preselected to divide by a ratio of 2:1 a rotation angle between the top dead center angular positions of successive cylinder stroke cycles.

* * * * *